United States Patent
Onishi et al.

(10) Patent No.: US 7,782,558 B2
(45) Date of Patent: Aug. 24, 2010

(54) OPTICAL DEVICE VIBRATOR

(75) Inventors: Satoshi Onishi, Amagasaki (JP); Minoru Fujita, Sakai (JP); Atsushi Matsuura, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 446 days.

(21) Appl. No.: 11/809,808

(22) Filed: Jun. 1, 2007

(65) Prior Publication Data
US 2007/0297066 A1   Dec. 27, 2007

(30) Foreign Application Priority Data

| Jun. 8, 2006 | (JP) | ............................. 2006-159333 |
| Nov. 13, 2006 | (JP) | ............................. 2006-306396 |

(51) Int. Cl.
G02B 7/02 (2006.01)
G02B 3/00 (2006.01)

(52) U.S. Cl. ...................................... 359/824; 359/649

(58) Field of Classification Search ......... 359/649–651, 359/819–824
See application file for complete search history.

(56) References Cited

U.S. PATENT DOCUMENTS

| 6,877,862 | B2 * | 4/2005 | Fukunaga et al. ............. 353/70 |
| 6,912,094 | B2 * | 6/2005 | Shigematsu et al. ......... 359/649 |
| 7,524,068 | B2 * | 4/2009 | Hayashi et al. ............... 353/51 |
| 2006/0152822 | A1 | 7/2006 | Imaoka et al. ............... 359/726 |

FOREIGN PATENT DOCUMENTS

| JP | 2-191987 A | 7/1990 |
| JP | 4-319937 A | 11/1992 |
| JP | 2001-4952 A | 1/2001 |

* cited by examiner

*Primary Examiner*—Mohammed Hasan
(74) *Attorney, Agent, or Firm*—Sidley Austin LLP (57) ABSTRACT

An optical device vibrator has a driving mechanism and a controller. The driving mechanism repeatedly changes position or angle of an optical device in predetermined cycles in order to vibrate the optical device. The controller controls driving of the driving mechanism and changes a setting for the position or angle serving as a reference for the repeated change based on predetermined correction information.

15 Claims, 9 Drawing Sheets

OPTICAL DEVICE VIBRATOR

This application is based on Japanese Patent Application No. 2006-159333 filed on Jun. 8, 2006 and Japanese Patent Application No. 2006-306396 filed on Nov. 13, 2006, the contents of which are hereby incorporated by reference.

BACKGROUND OF THE INVENTION

1. Field of the Invention

The present invention relates to an optical device vibrator, and more specifically to an optical device vibrator which vibrates an optical device (mirror, lens, or the like) forming part of a projection optical system projecting an image formed by a display device (digital micro mirror device, liquid crystal display device, or the like) onto a screen surface on an enlarged scale.

2. Description of Related Arts

In recent years, as image display apparatuses for use in BS digital broadcasting, a home theatre, or the like, high-performance, low-price projection-type image display apparatuses, that is, projectors have been increasingly wide spread which have a liquid crystal display device or a digital micro mirror device as a display device. There have been strong demands for a slim rear projector which does not take much space even in a narrow room. The display information volume is much higher than before, and display devices are further provided with higher and higher resolution than conventional ones, which creates demands for smooth, clear, high-quality images.

To achieve a low-price rear projector with high resolution, so-called pixel shift has been conventionally practiced by which an image projected on the screen surface is shifted periodically by a small amount (for example, one half of a pixel) so as to increase the number of apparent pixels. The practice of pixel shift causes pixels to be superimposed on one another, which makes the contour of the pixels projected on the screen surface less outstanding, thereby permitting display of a smooth image. Moreover, due to its ability to increase the volume of information displayed on the screen surface without changing the number of pixels of the display device, the pixel shift is very effective in achieving a higher-grade image through resolution improvement.

Patent documents 1 and 2 propose, as projectors making use of pixel shift, those which perform pixel shift by slightly decentering a reflective mirror. Patent document 3 discloses a projection exposure device which changes the lens position and posture by an actuator based on environment information obtained through measurement with environment sensors (air pressure sensor, temperature sensor, humidity sensor, and the like) so that favorable image formation performance can be maintained even in the event of environmental change.

[Patent document 1] JP-A-H2-191987
[Patent document 2] JP-A-H4-319937
[Patent document 3] U.S. Pat. No. 6,912,094 B2

Patent document 1 discloses configuration such that the vertical resolution of a projected image is improved by slightly changing the angle of a reflective mirror which bends image light emitted from a projector lens, although not disclosing detailed configuration for slightly changing the angle of the reflective mirror. Patent document 2 discloses configuration such that the vertical resolution of a projected image is improved by transferring by an actuator the position of a reflective mirror which guides to a projection optical system image light emitted from a liquid crystal panel, although not disclosing detailed configuration for slightly changing the position of the reflective mirror. The projection exposure device disclosed in Patent document 3 is configured such that deterioration in the optical performance attributable to environmental change is corrected by changing the lens position and the like. However, the actuator used in this configuration is a factor leading to complication and upsizing of the entire apparatus.

SUMMARY OF THE INVENTION

In view of the circumstances described above, the present invention has been made, and it is an object of the invention to provide an optical device vibrator capable of vibrating an optical device with high accuracy and also correcting the optical performance with simple configuration that does not lead to upsizing of the apparatus.

In order to achieve the object described above, according to one aspect of the invention, an optical device vibrator includes: a driving mechanism which repeatedly changes position or angle of an optical device in predetermined cycles in order to vibrate the optical device; and a controller which controls driving of the driving mechanism. The controller changes a setting for the position or angle serving as a reference for the repeated change based on predetermined correction information.

According to another aspect of the invention, a projection-type image display apparatus includes: a display device which forms a two-dimensional image; a projection optical system which guides onto a screen the two-dimensional image formed by the display device; a driving mechanism which repeatedly changes in predetermined cycles position or angle of an optical device forming part of the projection optical system; and a controller which controls driving of the driving mechanism. The controller, in connection with image display by the display device, controls the repeated change of the position or angle of the optical device, and, based on predetermined correction information, changes a setting for the position or angle serving as the reference for the repeated change.

According to still another aspect of the invention, in an image projection method of guiding a two-dimensional image formed by a display device onto a screen by a projection optical system, position or angle of an optical device forming part of the projection optical system is repeatedly changed in predetermined cycles in connection with image display by the display device, and a setting for the position or angle serving as a reference for the repeated change is changed based on predetermined correction information.

DETAILED DESCRIPTION OF PREFERRED EMBODIMENTS

Hereinafter, embodiments and the like of an optical device vibrator according to the present invention will be described with reference to the accompanying drawings. Portions equal to or corresponding to each other among the embodiments and the like are provided with the same numerals, and overlapping description will be omitted as appropriate.

Figure 1:
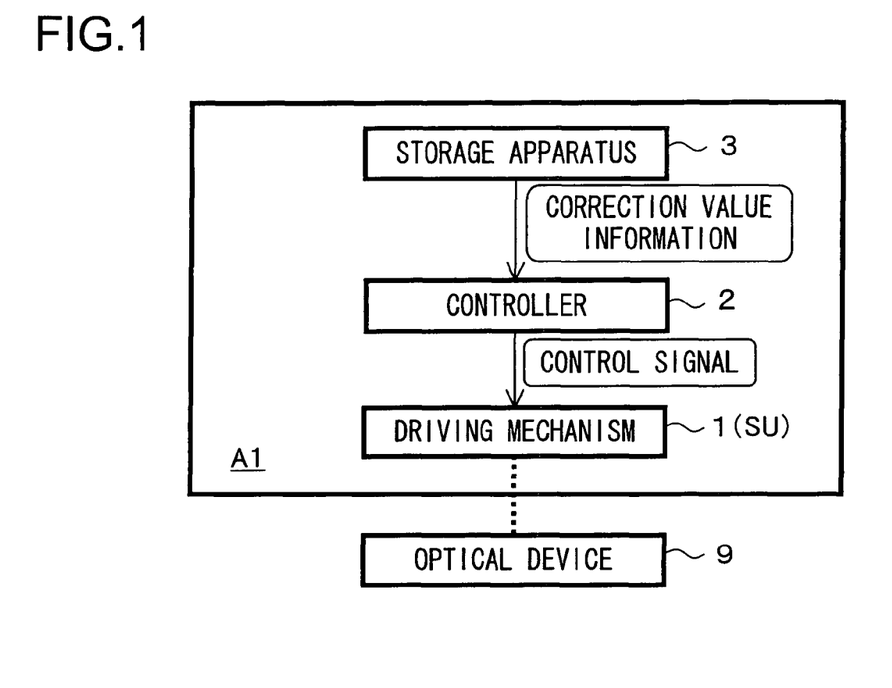
FIG. 1 is a block diagram showing schematic configuration of an optical device vibrator (of Type 1) according to an embodiment of the present invention.

FIG. 1 shows schematic configuration of an optical device vibrator A1 of Type 1. This optical device vibrator A1 has: a driving mechanism 1 which repeatedly changes the position or angle of an optical device 9 in predetermined cycles in order to vibrate the optical device 9; a controller 2 which controls driving of the driving mechanism 1; and a storage apparatus 3 which saves correction value information. The optical device 9 is, for example, part of a projection optical system in a projector, and at least one optical device (mirror, lens, or the like) 9 serves as a target of the optical device vibrator A1.

A projection optical system has different components each having error, thus causing some variation as a result of its assembly. Therefore, when the projector is activated, the position and angle of each component shift due to temperature increase or the like, thus resulting in image quality degradation (for example, position shift of a projected image or aberration deterioration). However, there is limitation in manually performing slight adjustment considering this shift and the variation described above in an assembly adjustment process. Thus, this optical device vibrator A1 adopts configuration for controlling the driving mechanism 1 so that the best optical performance can be provided when the projector is in use after activated.

The control described above is performed based on the correction value information saved in the storage apparatus 3 (nonvolatile memory or the like). The correction value information is calculated and set based on optical performance measured in the assembly adjustment process so that the best optical performance can be provided in usage state, and previously saved in the storage apparatus 3. The controller 2, when activated, reads the correction value information from the storage apparatus 3, and then based on this correction value information, changes the setting for the position or angle (of the optical device 9) serving as the reference for repeated change, more specifically, converts a control signal waveform in accordance with the magnitude of the correction value.

Figure 3:
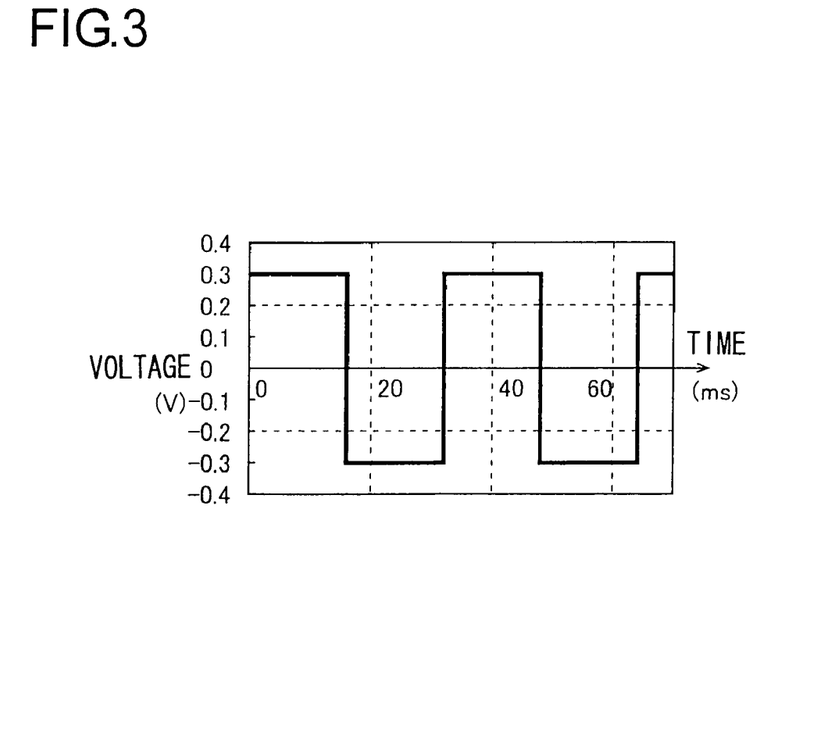
FIG. 3 is a graph showing a control signal waveform of the driving mechanism (in normal condition) according to the embodiments.

The converted control signal is inputted to the driving mechanism 1, which vibrates the optical device 9 mainly under the condition that the position or the angle is corrected. A driving force for vibrating the optical device 9 is generated from an actuator (voice coil motor, piezoelectric device, or the like) included in the driving mechanism 1, so that the converted control signal controls the driving of the actuator. For example, if control for making no correction is performed with a control signal waveform (in normal condition with a vibration center voltage of 0V serving as a reference) shown in FIG. 3, control for making correction with a correction value of +0.1V is performed with a control signal waveform (in shifted condition with a vibration center voltage of +0.1V serving as a reference) shown in FIG. 4. Performing control of repeatedly changing the position or angle of the optical device 9 in predetermined cycles by using this control signal waveform (FIG. 4) in shifted condition results in shift of the center position or center angle of the vibration of the optical device 9 by an amount corresponding to the magnitude of the corrected value. This therefore permits providing the best optical performance. The setting for the position or angle serving as a reference for the repeated change may be achieved by correction value adjustment through manual operation (for example, switch operation).

Figure 2:
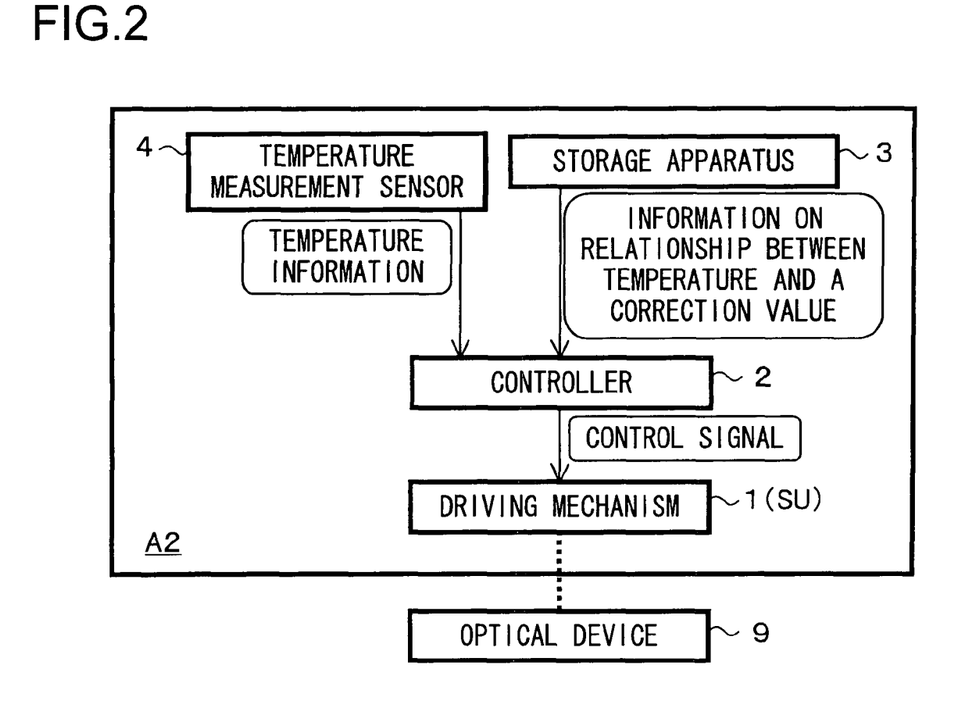
FIG. 2 is a block diagram showing schematic configuration of an optical device vibrator (of Type 2) according to an embodiment of the invention.

FIG. 2 shows schematic configuration of an optical device vibrator A2 of Type 2. This optical device vibrator A2 has: a driving mechanism 1 which repeatedly changes the position or angle of an optical device 9 in predetermined cycles in order to vibrate the optical device 9; a controller 2 which controls driving of the driving mechanism 1; a storage apparatus 3 which saves information on relationship between temperature and a correction value; and a sensor 4 which detects and outputs temperature information. The optical device 9, for example, forms part of a projection optical system in a projector, and at least one optical device (mirror, lens, or the like) 9 serves as a target of the optical device vibrator A2.

Structures (holder, optical base components, and the like) for holding the optical device are usually formed of metal (aluminum or the like) or plastic; therefore, in the event of temperature change while the projector is in use, the thermal expansion occurs whereby the dimension thereof changes. This causes shift of the position and angle of the optical device 9 and thus image quality degradation of a projected image (for example, position shift of a projected image or aberration deterioration). Thus, this optical device vibrator A2 adopts configuration for controlling the driving mechanism 1 so that the degree of image quality degradation is reduced by using correction information corresponding to temperature information.

The control described above is performed based on the correction information (that is, information on the relationship between temperature and a correction value) saved in the storage apparatus 3 (nonvolatile memory or the like). The correction information is correction information corresponding to the temperature information from the temperature measurement sensor 4, and previously saved in the storage apparatus 3 as information on the relationship between a temperature value and a correction value for achieving optimum optical performance at this temperature. On the other hand, the temperature information (for example, outside air temperature, temperatures of the projection optical system and the like) is measured by the temperature measurement sensor 4 and then a result of this measurement is inputted as temperature information to the controller 2. The controller 2, based on the temperature information inputted from the temperature measurement sensor 4 and the information on the relationship between a temperature value and a correction value which information is read from the storage apparatus 3, determines a correction value, and then, based on this correction value, changes the setting for the position or angle (of the optical device 9) serving as a reference for repeated change. More specifically, the controller 2 converts the control signal waveform in accordance with the magnitude of the correction value.

The converted control signal is inputted to the driving mechanism 1, which vibrates the optical device 9 mainly under the condition that the position or the angle is corrected. A driving force for vibrating the optical device 9 is generated from an actuator (voice coil motor, piezoelectric device, or the like) included in the driving mechanism 1, so that the converted control signal controls the driving of the actuator. For example, if control for making no correction is performed with the waveform of a control signal (in normal condition with a vibration center voltage of 0V serving as a reference) shown in FIG. 3, control for making correction with a correction value of +0.1V is performed with the control signal waveform (in shifted condition with a vibration center voltage of +0.1V serving as a reference) shown in FIG. 4. Performing control of repeatedly changing the position or angle of the optical device 9 in predetermined cycles by using this control signal waveform (FIG. 4) in shifted condition results in shift of the center position or center angle of the vibration of the optical device 9 by an amount corresponding to the magnitude of the corrected value. This therefore permits reducing deterioration in optical performance attributable to temperature change, thus maintaining favorable optical performance.

Any of sensors (humidity measurement sensor, air pressure measurement sensor, and the like) other than the temperature measurement sensor 4 may be used or they may be used in combination. In this case, the correction information corresponds to environment information values (temperature, humidity, air pressure, and the like) from the different sensors, and may be previously saved in the storage apparatus 3 as information on relationship between an environment information value and a correction value for achieving optimum optical performance at the corresponding environmental information value.

Both types of the optical device vibrators A1 and A2 described above have the driving mechanism 1 which repeatedly changes the position or angle of the optical device 9 in predetermined cycles in order to vibrate the optical device 9, and the controller 2 which controls driving of the driving mechanism 1, and the controller 2 changes the setting for the position or angle serving as a reference for repeated change based on predetermined correction information. This therefore permits vibrating the optical device 9 with high accuracy and correcting optical performance with simple configuration that dose not leads to upsizing of the apparatus. That is, the driving mechanism 1 is originally provided with configuration that permits changing the position or angle of the optical device 9, and can apply this point and appropriately set a correction value of the position or inclination (for example, vibration center position or vibration center inclination) of the optical device 9, thereby permitting correction of image quality degradation.

For example, use of the optical device vibrator A1 or A2 for an optical device forming part of a projection optical system in a projector permits making the contour of pixels projected on the screen surface less outstanding by way of pixel shift to display with high accurate to thereby display a smooth image while holding favorable optical performance, thus stably achieving higher image grade through resolution improvement. This therefore can greatly contribute to providing a slimmer, lighter-weight, more compact, lower-cost, higher-performance, and higher-function projector. The target of application of the control configuration described above is not limited to a projector, and thus the control configuration is also applicable to, for example, pixel shift of a light receiving device (for example, charge-coupled device (CCD)) in a digital camera.

As in the optical device vibrator A1 of the 1, saving into the storage apparatus 3 at product assembly a correction value that permits providing the best optical performance in usage condition as correction information permits favorable correction of the optical performance by changing based on this correction information a setting for the position or angle serving as a reference for the repeated change by the controller 2. Therefore, preferable configuration is such that there are provided: a driving mechanism which repeatedly changes position or angle of an optical device in predetermined cycles in order to vibrate the optical device, a controller which controls driving of the driving mechanism, and a storage apparatus which saves correction information, and such that the controller reads the correction information from the storage apparatus and then changes a setting for the position or angle serving as a reference for the repeated change based on this correction information.

As in the optical device vibrator A2 of Type 2, providing a sensor which detects and outputs environment information (temperature, humidity, air pressure, or the like) permits the controller 2 to read correction information corresponding to the environment information from the storage apparatus 3 and change a setting for the position or angle serving as a reference for the repeated change based on the correction information, which reduces deterioration in the optical performance attributable to environmental change thus maintaining favorable optical performance. Therefore, preferable configuration is such that there are provided a driving mechanism which repeatedly changes the position or angle of an optical device in predetermined cycles in order to vibrate the optical device, a controller which controls driving of this driving mechanism, a storage apparatus which saves correction information, and a sensor which detects and outputs environment information, and such that the controller reads from the storage apparatus the correction information corresponding to environment information from the sensor and changes a setting for the position or angle serving as a reference for the repeated change based on this correction information.

Figure 5:
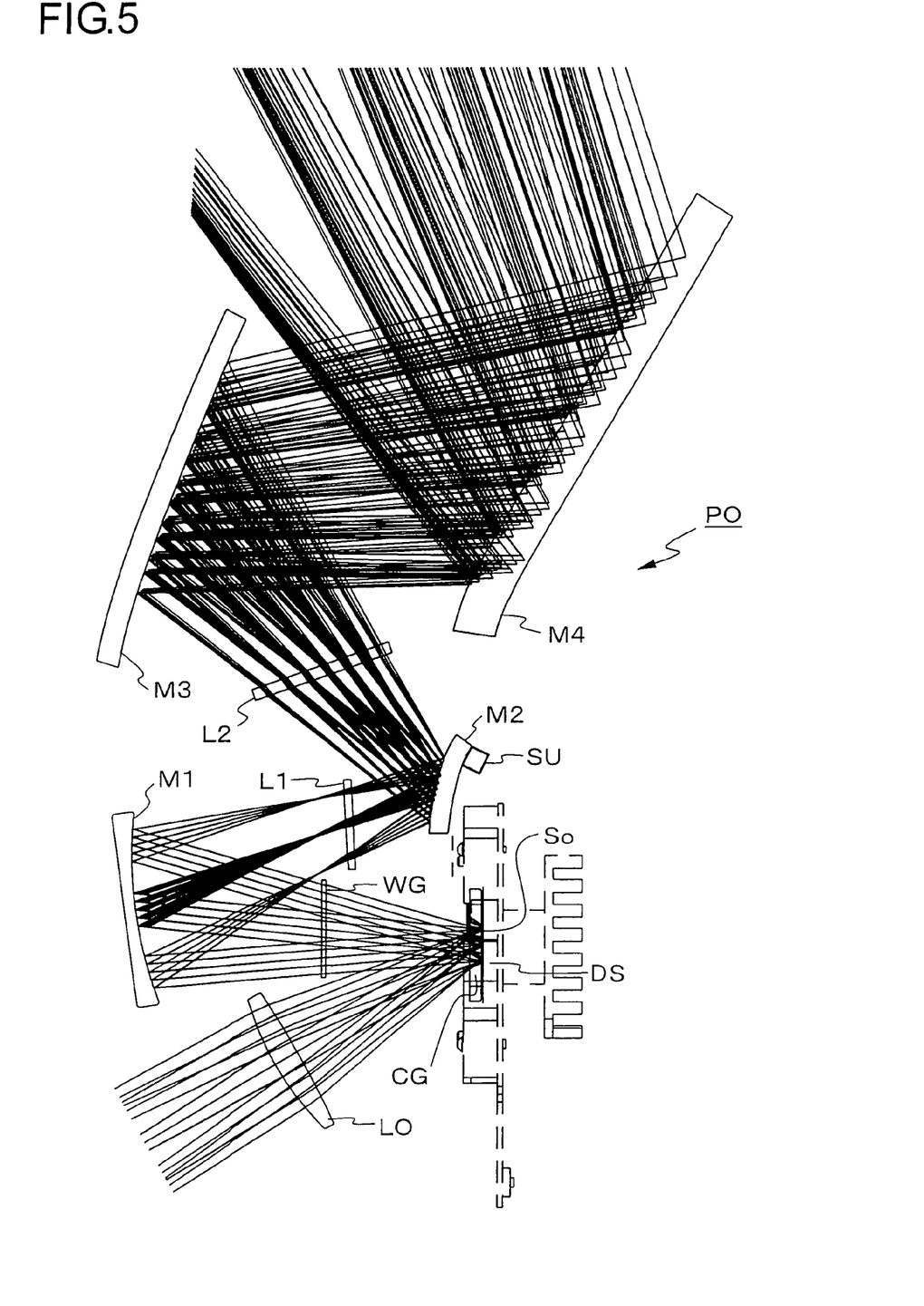
FIG. 5 is an optical path diagram showing optical configuration of a projection-type image display apparatus loaded with a pixel shift mechanism as the driving mechanism.

Next, as the driving mechanism 1 (FIGS. 1 and 2), a projection-type image display apparatus provided with a pixel shift mechanism SU will be described. FIG. 5 shows optical configuration of the projection-type image display apparatus composed of a projection optical system PO, an illumination optical system LO, and the like. FIG. 5 shows an optical sectional view of optical configuration (optical arrangement, projection optical path, and the like) of the projection optical system PO and the like as viewed along the longer direction of the image area on a display device surface So. That is, FIG. 5 shows the optical configuration of the projection-type image display apparatus in xy cross-section in a rectangular coordinate system (x, y, z) where the normal direction of the display device surface So is x direction, the shorter direction of the image area on the display device surface So is y direction, and the longer direction of the image area on the display device surface So is z direction.

The projection optical system PO shown in FIG. 5 is an oblique projection optical system which obliquely projects an image of the display device surface So composed of a plurality of pixels onto the screen surface (not shown) on an enlarged scale, and which is designed for a projection-type image display apparatus (rear projector, front projector, or the like). Therefore, the display device surface So corresponds to an image formation surface of a display device where a two-dimensional image is formed by light intensity modulation or the like. Here, the digital micromirror device is assumed as a display device, although not limited thereto, and thus a different non-radiative, reflective (or transmissive) display device (for example, crystal liquid display device) may be used. When the digital micromirror device is used as a display device, light entering thereto is reflected by the micromirrors in ON/OFF state (for example, inclined at a degree of ±12) and thereby spatially modulated. In this condition, only the light reflected by the micromirrors in ON state enters to the projection optical system PO and is projected on the screen surface.

Light from an illumination optical system LO is spatially modulated by a display device DS, and the image formed as a result of this special modulation is projected by the projection optical system PO on an enlarged scale. In the projection optical system PO, there are arranged in order along the projection optical path from the display device surface So to the screen surface, a cover glass CG, a dust-proof transmitting glass WG, a first curved mirror M1, a refractive lens L1, a second curved mirror M2, a refractive lens L2, a third curved mirror M3, and a fourth curved mirror M4.

As described above, pixels are superimposed on one another by performing pixel shift, so that the contour of the pixels projected on the screen surface becomes less outstanding, thus permitting displaying a smooth image. Moreover, since the volume of information displayed on the screen surface can be increased without changing the number of pixels of the display device, pixel shift is very effective in achieving a higher-grade image through resolution improvement (that is, an increase in the number of apparent pixels). To perform pixel shift, an image projected on the screen surface needs to be shifted by a very small amount (for example, one half of a pixel pitch). However, addition to the projection optical system an optical component not having an optical power for image projection results in an increase in the number of components, an increase in the back-focus, and the like, which in turn lead to upsizing of the apparatus as a whole and cost increase. Moreover, configuration for decentering a refractive surface causes a problem of occurrence of chromatic aberration and the like. Thus, the projection-type image display apparatus shown in FIG. 5 adopts configuration such that the pixel shift is achieved by slightly decentering the second curved mirror M2 forming part of the projection optical system PO by the pixel shift mechanism SU.

Figure 6:
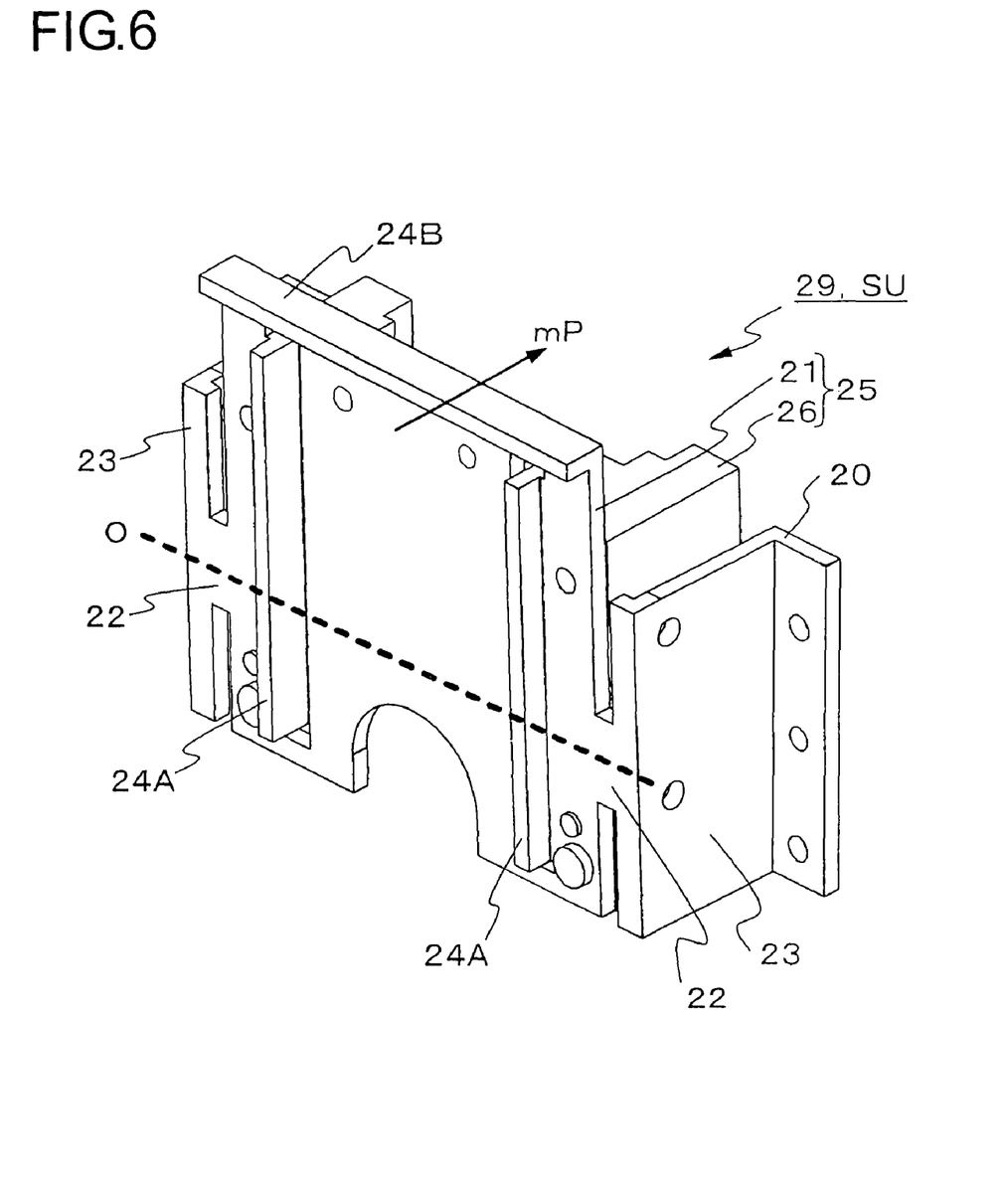
FIG. 6 is a perspective view showing external appearance of a vibration member of the pixel shift mechanism of FIG. 5.
Figure 7:
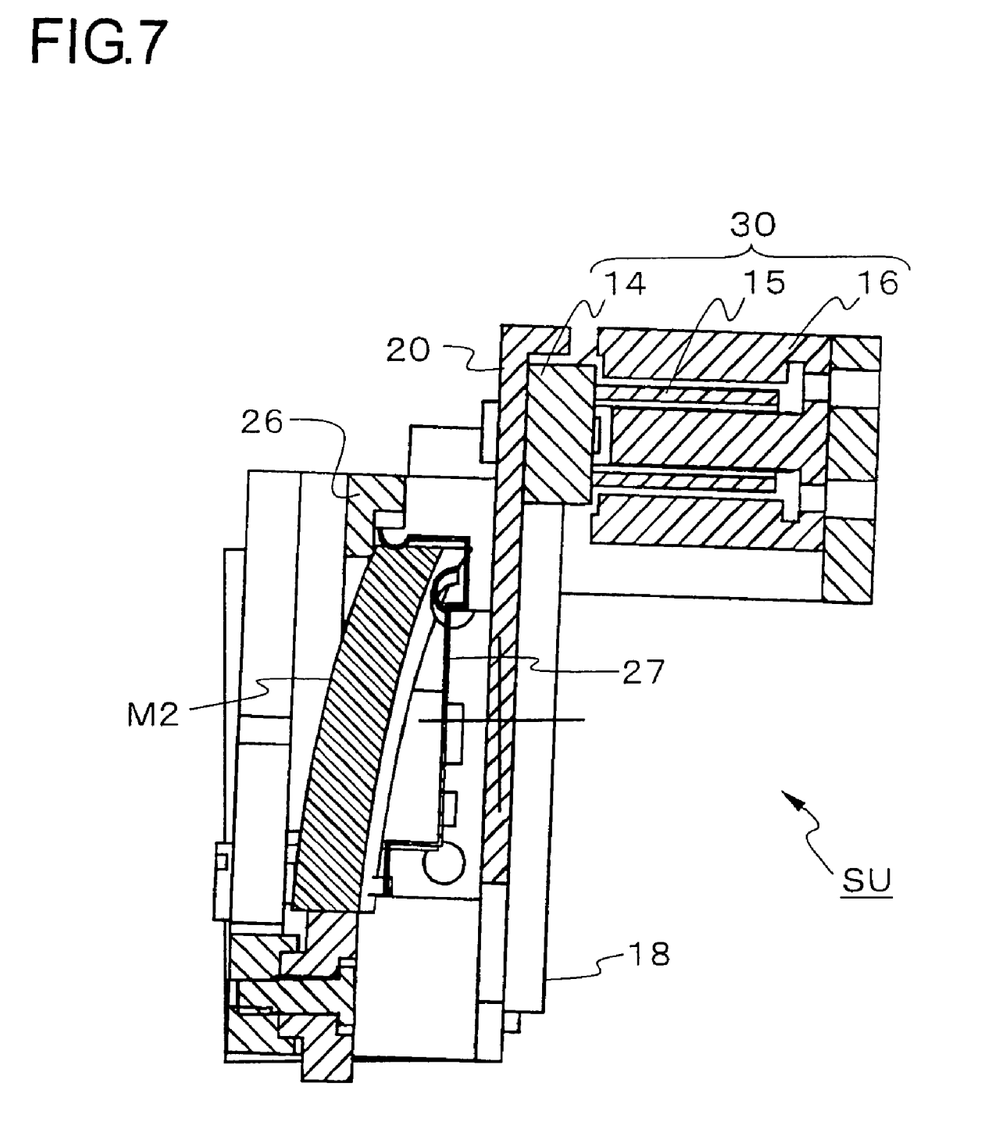
FIG. 7 is a sectional view showing assembly structure of the pixel shift mechanism of FIG. 5.
Figure 8:
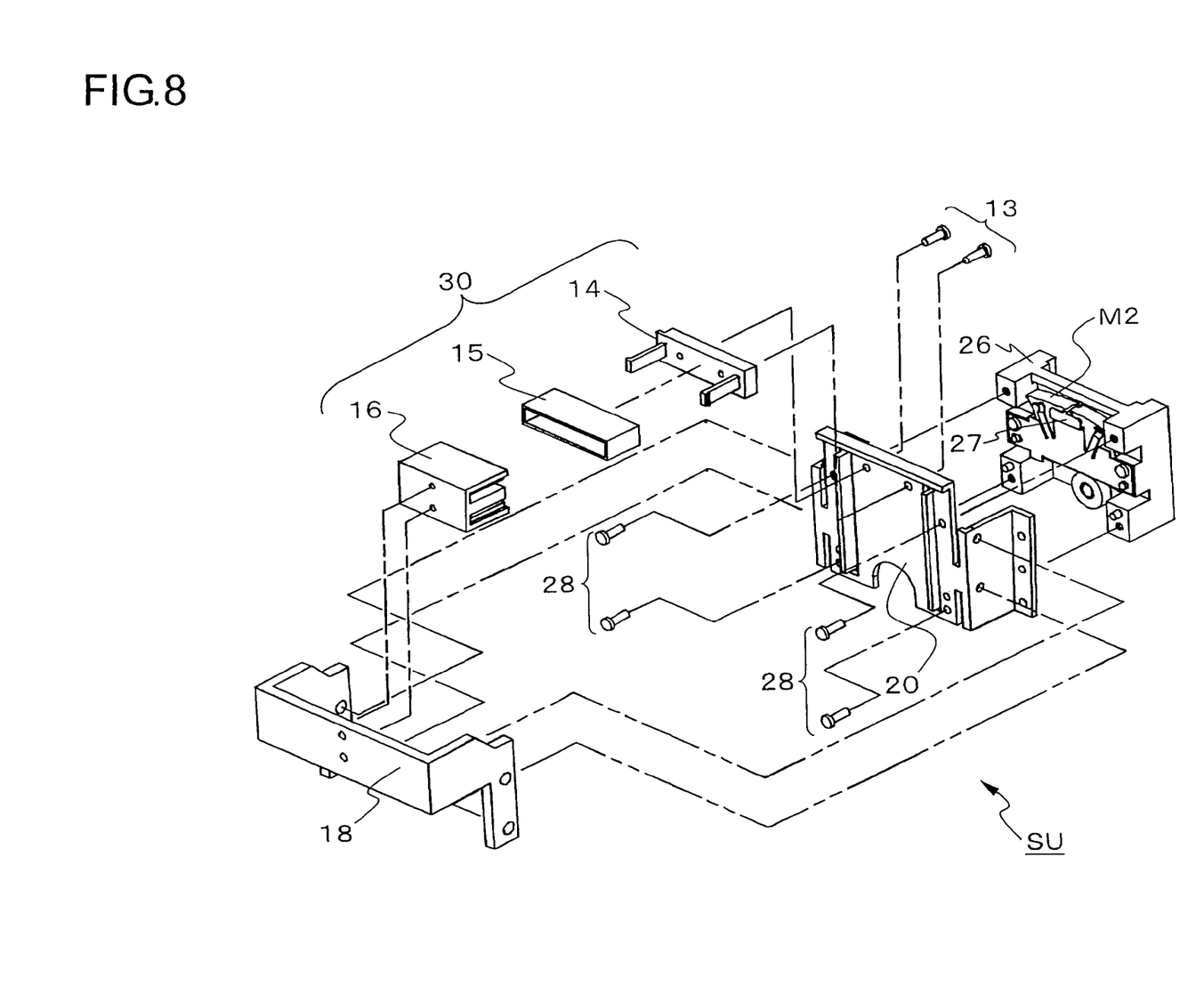
FIG. 8 is an exploded perspective view showing assembly structure of the pixel shift mechanism of FIG. 5.

Upon performing the pixel shift, the pixel shift mechanism SU, in connection with image display switching by the display device DS, changes the inclination of the second curved mirror M2 and performs pixel shift by vibration thereof. FIG. 6 is a perspective view showing partial external appearance of the pixel shift mechanism SU. FIG. 7 is a sectional view showing assembly structure of the pixel shift mechanism SU. FIG. 8 is an exploded perspective view showing assembly structure of the pixel shift mechanism SU. The pixel shift mechanism SU is provided with: a vibration member 29 (FIG. 6) which vibrates the second curved mirror M2 while keeping the second curved mirror M2 held, and an actuator 30 (FIGS. 7 and 8) which drives the vibration member 29 to vibrate the second curved mirror M2.

Figure 9:
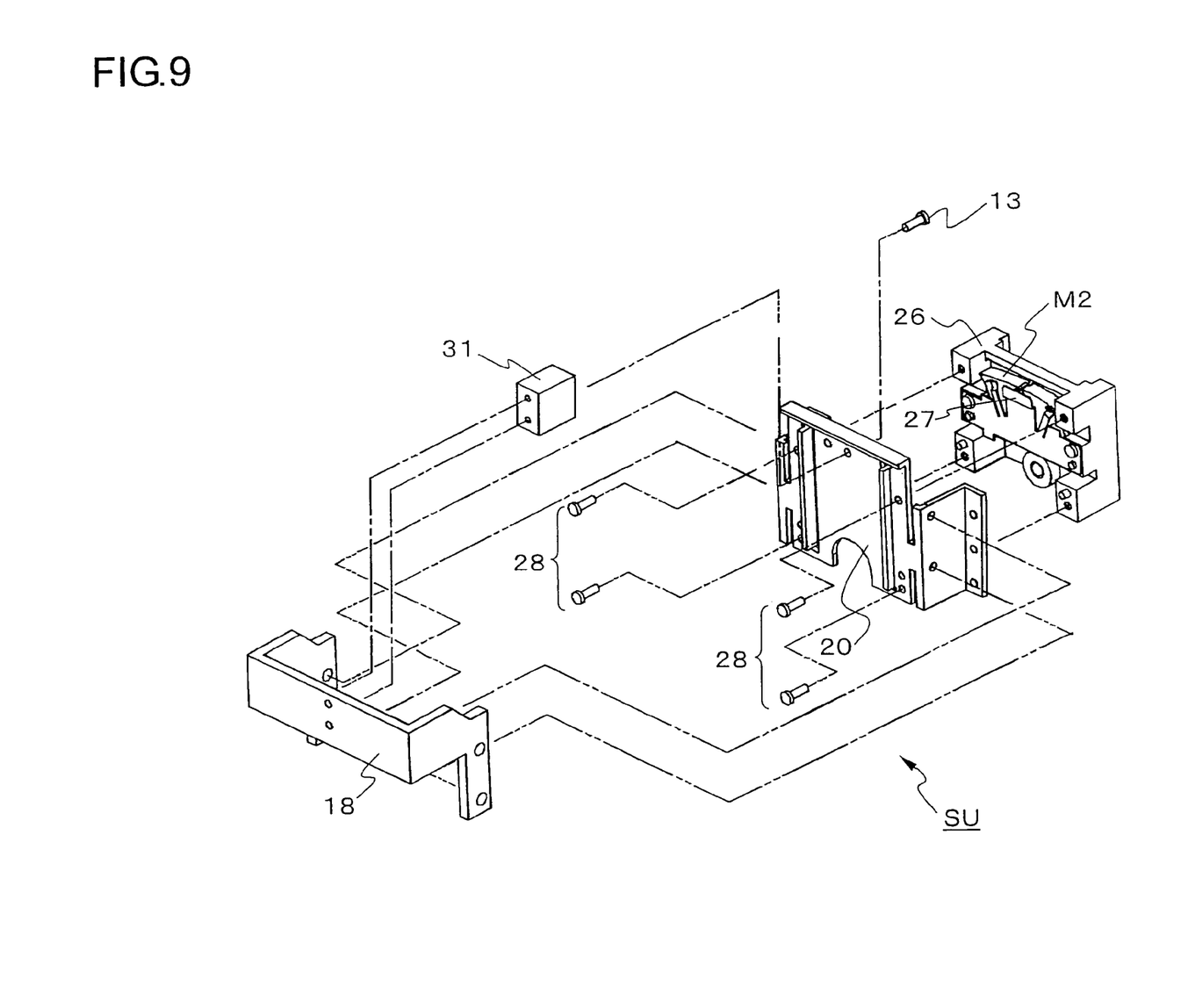
FIG. 9 is an exploded perspective view showing assembly structure of the pixel shift mechanism when a piezoelectric device is used as an actuator.

The vibration member 29 is composed of a spring-like member 20, a mirror holder 26, and the like, and as shown in FIG. 6, has: a pair of fixation parts 23, a movable part 25 which can vibrate relative to the fixation parts 23 while holding the second curved mirror M2 (FIGS. 7 and 8), and a pair of hinge parts 22 which couple together the fixation parts 23 and the movable part 25. The fixation parts 23, the hinge parts 22, and also part of the movable part 25 are formed of spring-like members 20. The movable part 25 is composed of a movable plate 21 formed of part of the spring-like member 20, the mirror holder 26 fixed to this movable plate 21, and the like. On the movable plate 21, a pair of vertical ribs 24A and one horizontal rib 24B is integrally formed by partially bending a steel plate. The actuator 30, as shown in FIGS. 7 and 8, is formed with a voice coil motor composed of a coil holder 14, a coil 15, and a magnet unit 16. Note that, instead of the voice coil motor, any of different driving devices (piezoelectric device and the like) may be used. As one example thereof, FIG. 9 shows assembly structure of the pixel shift mechanism SU when the actuator 31 formed of a piezoelectric device is used.

As shown in FIGS. 7 and 8, the second curved mirror M2 is held to the mirror holder 26 with a spring 27 which is provided for mirror fixation. The mirror holder 26, as shown in FIG. 8, is fixed to the spring-like member 20 with screws 28. However, both the holding method and the fixation method are not limited thereto, and thus any of fixation with a spring, fixation with screws, fixation with an adhesive agent, and the like may be adopted. The spring-like member 20 is fixed, by the fixation parts 23 (FIG. 6) included on the both sides thereof, to an assembly holder 18 (FIG. 8) with screws (not shown). To the spring-like member 20, the coil holder 14 is fixed with screws 13. To the coil holder 14, the coil 15 is fitted. On the other hand, to the assembly holder 18, the magnet unit 16 is fixed with screws (not shown). The fixation parts 23 are fixed to an optical base component (not shown).

As described above, the coil holder 14, the coil 15, and the magnet unit 16 form the actuator (voice coil motor) 30 which drives the second curved mirror M2. Since one end of the actuator 30 is fixed to the assembly holder 18, when the actuator 30 is operated, a force from the actuator 30 is added to the movable plate 21 of the spring-like member 20. As a result, the spring-like member 20 is deformed in such a manner as to rotate about the hinge parts 22. This deformation changes the angles of the mirror holder 26 and the second curved mirror M2. Switching the direction of a force received from the actuator 30 permits rotating and vibrating the movable part 25 with a straight line linking together the centers of the pair of hinge parts 22 being provided as a central axis O (FIG. 6), which will be described in detail below.

Figure 4:
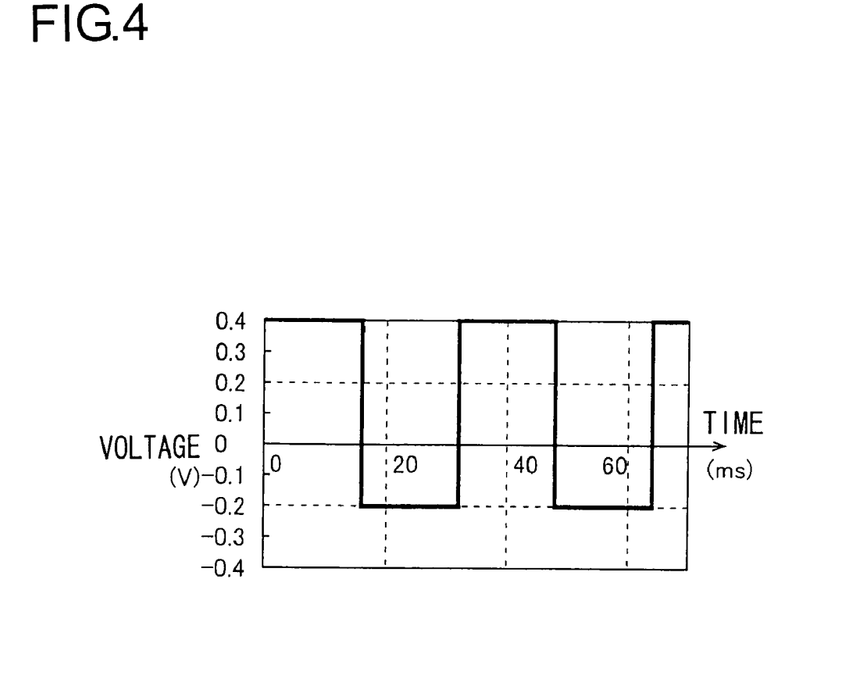
FIG. 4 is a graph showing a control signal waveform of the driving mechanism (in shifted condition) according to the embodiments.

When the control signal waveform (in shifted condition) of a driving signal shown in FIG. 4 is added to the actuator 30, the driving signal is a rectangular signal which repeats two states + and − (two states of +0.4V and −0.2V in every 16 ms) in fixed cycles (32 ms). Passage of a current through the coil 15 generates an electromagnetic power between the coil 15 and the magnet unit 16, and a driving force thereof is added to the upper part of the movable plate 21 of the spring-like member 20. Since the spring-like member 20 is fixed by the fixation parts 23 provided on the both sides thereof to the assembly holder 18, the hinges of the hinge parts 22 are twisted. As a result, the mirror holder 26 and the second curved mirror M2 together with the movable plate 21 of the spring-like member 20 are tilted.

For example, when the driving signal is in the + state, the spring-like member 20 receives a force in an arrow mP direction (FIG. 6) and is rotationally deformed in the same direction as the direction of this force. In this condition, the force generated by the actuator 30 and the force generated by the twisting of the spring-like member 20 are in good balance. Setting the driving signal at zero (that is, stopping the passage of a current through the coil 15) sets at zero the force generated by the actuator 30. As a result, the spring-like member 20 attempts to return to its initial position by a restoring force of the twisting. When the driving signal is in the − state, the spring-like member 20 is rotationally deformed in the direction opposite to the direction when the driving signal is in the + states (direction opposite to the arrow mP direction).

Therefore, adding a driving signal as shown in FIG. 4 to the actuator 30 causes the movable plate 21 of the spring-like member 20, the mirror holder 26 and the second curved mirror M2 fixed to the movable plate 21 to perform rotational vibration of repeatedly performing switching operation between the two angle states. The rotational vibration performed by the second curved mirror M2 which reflects projected light results in that projected light also has shift in the image formation position between two states. Performing pixel shift by appropriately controlling the shifted states can improve the pseudo resolution of the projected image.

In the projection optical system shown in FIG. 5, the reflection surfaces of the third curved mirror M3 and the fourth curved mirror M4 shift upward with respect to the paper surface due to temperature increase. Under the influence of this shift, astigmatism occurs on the screen. This astigmatism can be suppressed by changing by the aforementioned control the setting for the vibration center angle of the second curved mirror M2 in a counterclockwise direction with respect to the paper surface (with the magnitude of a correction value corresponding to a correction value of +0.1V shown in FIG. 4).

The position (angle) of the second curved mirror M2 is detected by a sensor (not shown) formed of a Hall device. This sensor is fixed on the upper part of the movable plate 21 of the spring-like member 20 and detects, as magnetic field change, relative movement (that is, relative position change) of a sensor magnet (not shown) fixed to the assembly holder 18. Based on a result of this detection, the position (angle) of the second curved mirror M2 can be obtained.

In the embodiment described above, an optical system using a curved mirror is illustrated as a projection optical system, although the invention is not limited thereto. As the projection optical system, a refractive optical system may be used, which, for example, performs the inclination control of a reflective mirror described in patent documents 1 and 2.

Like the optical device vibrator A2 of Type 2, providing a sensor which detects and outputs environment information (temperature, humidity, air pressure, and the like) permits reducing deterioration in the optical performance attributable to environment change and thus maintaining favorable optical performance. However, considering loading in an optical apparatus such as the projection-type image display apparatus (FIG. 5 and the like) described above, the cause of image quality degradation and the like are not limited to the environmental change. For example, image quality degradation attributable to operating condition change of the projection-type image display apparatus may occur. Such problems are solved by optical device vibrators A3 to A6 of Types 3 to 6 to be described below. The optical device vibrators A3 to A6 can reduce image quality degradation attributable to operating condition change by detecting and outputting by sensors 5 to 7 image area position information, sound pressure information, optical system position information, and the like as operation information.

Figure 10:
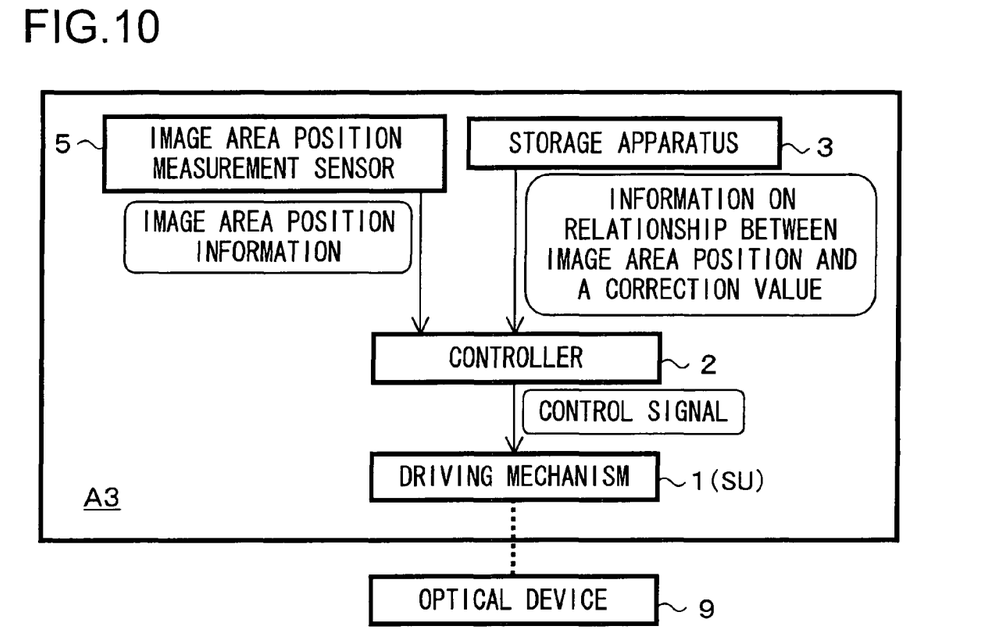
FIG. 10 is a block diagram showing schematic configuration of an optical device vibrator (of Type 3) according to an embodiment of the invention.

FIG. 10 shows schematic configuration of the optical device vibrator A3 of Type 3. This optical device vibrator A3 is a vibrator for vibrating an optical device in a projection-type image display apparatus, and has: a driving mechanism 1 which repeatedly changes the position or angle of an optical device 9 in predetermined cycles to vibrate the optical device 9, a controller 2 which controls driving of the driving mechanism 1, a storage apparatus 3 which saves information on relationship between image area position of a projected image and a correction value, and a sensor 5 which detects and outputs image area position information. The optical device 9, for example, forms part of a projection optical system in a projector, and at least one optical device (mirror, lens or the like) 9 serves as a target of the optical device vibrator A3.

In the event of temperature change or vibration while the projector is in use, position shift of the projected image may occur. This position shift of the projected image is measured by a image area position measurement sensor 5, detailed examples of which are a CCD (charge-coupled device), a CdS device (photoconductive device), and the like. The image area position measurement sensor 5, by directly receiving a projected image or photographing a projected image irradiated to an object, measures the image area position based on the position of the projected ray of light. Then, the measurement of the image area position is made by arranging the image area position measurement sensor 5 so that the position (image area corner or the like) of part of the projected image can be measured. Alternatively, at position outside the image area, laser light may be irradiated via the projection optical system PO (FIG. 5) and this position may be measured to thereby measure the image area position.

In this optical device vibrator A3 adopts configuration such that, by using correction information corresponding to image area position information, the driving mechanism 1 is controlled so that the amount of position shift becomes small. This control is performed based on correction information (that is, information on relationship between image area position and a correction value) saved in the storage apparatus 3 (nonvolatile memory or the like). The correction information is correction information corresponding to the image area position information from the image area position measurement sensor 5, and previously saved in the storage apparatus 3 as information on relationship between each image area position and a correction value for achieving appropriate image area position. On the other hand, the image area position is measured by the image area position measurement sensor 5, and a result of this measurement is inputted as image area position information to the controller 2. The controller 2, based on the image area position information inputted from the image area position measurement sensor 5 and the information on the relationship between image area position and a correction value which is read from the storage apparatus 3, determines a correction value, and based on this correction value, changes the setting for the position or angle (of the optical device 9) serving as a reference for repeated change. More specifically, the controller 2 converts the control signal waveform in accordance with the magnitude of the correction value.

The converted control signal is inputted to the driving mechanism 1, which vibrates the optical device 9 mainly under the condition that the position or the angle is corrected. A driving force for vibrating the optical device 9 is generated from an actuator (voice coil motor, piezoelectric device, or the like) included in the driving mechanism 1, so that the converted control signal controls the driving of the actuator. For example, if control for making no correction is performed with the control signal waveform (in normal condition with a vibration center voltage of 0V serving as a reference) shown in FIG. 3, control for making correction with a correction value of +0.1V is performed with the control signal waveform (in shifted condition with a vibration center voltage of +0.1V serving as a reference) shown in FIG. 4. Performing control of repeatedly changing the position or angle of the optical device 9 in predetermined cycles by using this waveform of the control signal (FIG. 4) in shifted condition results in shift of the center position or center angle of the vibration of the optical device 9 by an amount corresponding to the magnitude of the corrected value. This therefore permits reducing shift of the projection image area position even in the event of image area position change due to external influence (temperature change, vibration, sound, and the like). Therefore, image quality degradation and the like attributable to projector operating condition change can be reduced, thus maintaining favorable optical performance.

Figure 11:
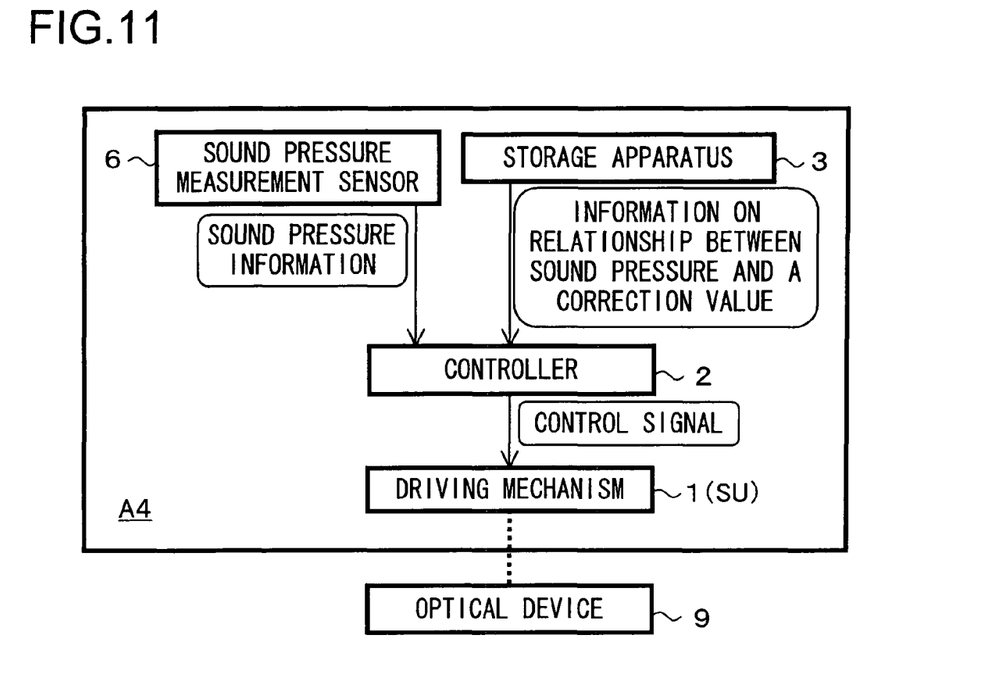
FIG. 11 is a block diagram showing schematic configuration of an optical device vibrator (of Type 4) according to an embodiment of the invention.

FIG. 11 shows schematic configuration of the optical device vibrator A4 of Type 4. This optical device vibrator A4 is a vibrator for vibrating an optical device in a projection-type image display apparatus having a speaker fitted inside or outside thereof, and has a driving mechanism 1 which repeatedly changes the position or angle of an optical device 9 in predetermined cycles to vibrate the optical device 9, a controller 2 which controls driving of the driving mechanism 1, a storage apparatus 3 which saves information on relationship between sound pressure generated from the speaker and a correction value, and a sensor 6 which detects and outputs sound pressure information. The optical device 9, for example, forms part of a projection optical system in a projector, and at least one optical device (mirror, lens, or the like) 9 serves as a target of the optical device vibrator A4.

For example, when a projector having a speaker provided inside or outside thereof is used, the mirror or folded mirror of the projection optical system, or a cabinet of a rear projection TV vibrate due to sound pressure generated from the speaker, which may cause position shift of a projected image. The sound pressure generated from this speaker is measured by a sound pressure measurement sensor 6, a detailed example of which is a microphone. The sound pressure measurement sensor 6 is a device which, in accordance with a value of sound pressure of a sonic wave entering the sensor, can change values of capacitance and potential difference. The sound pressure is measured with this sound pressure measurement sensor 6 being fitted to the surrounding of the projection optical system PO (FIG. 5) or a screen surrounding part.

The shift of the image area position of the projected image due to the sound pressure changes within a short period of time in substantially synchronous with the sound pressure change. This optical device vibrator A4 adopts configuration such that the sound pressure is measured by the sound pressure measurement sensor 6 and also the driving mechanism 1 is controlled based on correlation between the measured value and the image area shift so as to reduce the amount of position shift. This control is performed based on correction information (that is, information on relationship between sound pressure and a correction value) saved in the storage apparatus 3 (nonvolatile memory or the like). The correction information is correction information corresponding to the sound pressure information from the sound pressure measurement sensor 6, and is previously saved in the storage apparatus 3 as information on the relationship between a sound pressure value and a correction value for achieving optimum optical performance for this sound pressure. On the other hand, the sound pressure is measured by the sound pressure measurement sensor 6, and a result of this measurement is inputted as sound pressure information to the controller 2. The controller 2, based on the sound pressure information inputted from the sound pressure measurement sensor 6 and the information on the relationship between the sound pressure and a correction value which information is read from the storage apparatus 3, determines a correction value, and based on this correction value, changes the setting for the position or angle (of the optical device 9) serving as a reference for repeated change. More specifically, the controller 2 converts the waveform of a control signal in accordance with the magnitude of the correction value.

The converted control signal is inputted to the driving mechanism 1, which vibrates the optical device 9 mainly under the condition that the position or the angle is corrected. A driving force for vibrating the optical device 9 is generated from an actuator (voice coil motor, piezoelectric device, or the like) included in the driving mechanism 1, so that the converted control signal controls the driving of the actuator. For example, if control for making no correction is performed with the control signal waveform (in normal condition with a vibration center voltage of 0V serving as a reference) shown in FIG. 3, control for making correction with a correction value of +0.1V is performed with the control signal waveform (in shifted condition with a vibration center voltage of +0.1V serving as a reference) shown in FIG. 4. Performing control of repeatedly changing the position or angle of the optical device 9 in predetermined cycles by using this control signal waveform (FIG. 4) in shifted condition results in shift of the center position or center angle of the vibration of the optical device 9 by an amount corresponding to the magnitude of the corrected value. This therefore permits reducing projection image area position change due to the influence of sound pressure. Therefore, image quality degradation and the like attributable to projector operating condition change can be reduced, thus maintaining favorable optical performance. In some cases, sound information other than the sound pressure information may be used. For example, use of a signal or information for driving the speaker instead of the sound pressure information permits suppressing projection image area position change due to the influence of sound pressure without using the sound pressure measurement sensor 6.

Figure 12:
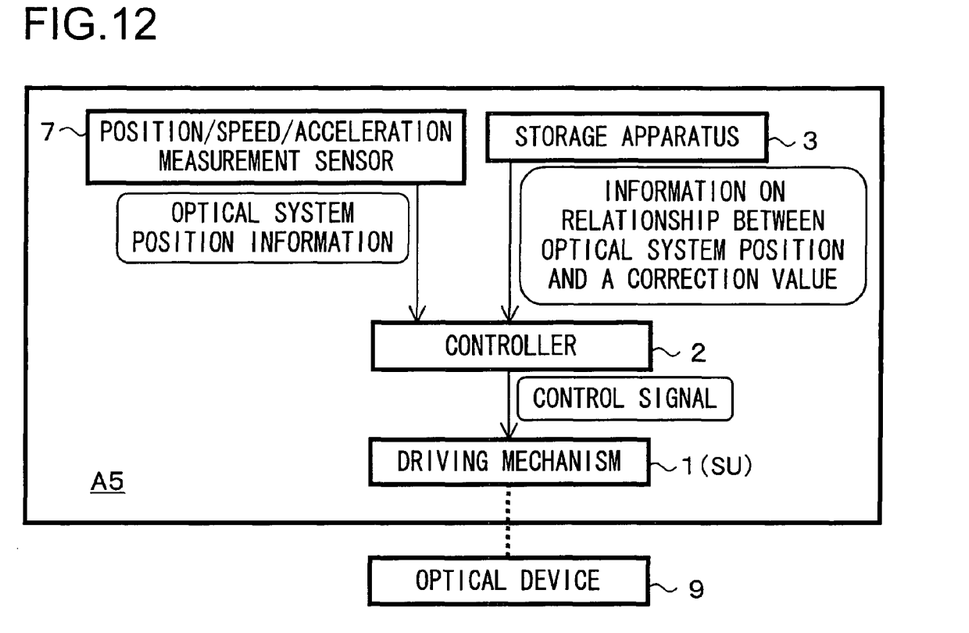
FIG. 12 a block diagram showing schematic configuration of an optical device vibrator (of Type 5) according to an embodiment of the invention.

FIG. 12 shows schematic configuration of the optical device vibrator A5 of Type 5. This optical device vibrator A5 is a vibrator for vibrating an optical device in a projection-type image display apparatus, and has a driving mechanism 1 which repeatedly changes the position or angle of an optical device 9 in predetermined cycles to vibrate the optical device 9, a controller 2 which controls driving of the driving mechanism 1, a storage apparatus 3 which saves information on relationship between projection optical system position and a correction value, and a sensor 7 which detects and outputs optical system position information. The optical device 9, for example, forms part of a projection optical system in a projector, and at least one optical device (mirror, lens, or the like) 9 serves as a target of the optical device vibrator A5.

There is a risk that movement, such as vibration, of the projection optical system while the projector is in use causes position shift of a projected image. The displacement of the projection optical system in this condition is measured by a position/speed/acceleration measurement sensor 7. The position/speed/acceleration measurement sensor 7 is a sensor for measuring position, a sensor for measuring speed, or a sensor for measuring acceleration. The sensor for measuring position is a device capable of changing a current value, potential difference, and the like, in accordance with position. Position measurement is made by adopting, for example, a method of making measurements by having a light receiving device (CCD or the like) arranged on the moving side and a light emitting device on the fixed side, and focusing light from the light emitting device on the light receiving device to measure the position on the moving side as light intensity distribution of the light receiving device. The sensor for measuring a speed is a device capable of changing a current value, potential difference, and the like in accordance with speed. Detailed examples of such a sensor include a Doppler measuring instrument (which reflects an ultrasonic wave or a light wave on the moving side object to measure frequency change) and the like. The sensor for measuring an acceleration is a device capable of changing a current value, potential difference, and the like in accordance with acceleration. Detailed examples of such a sensor include: a device (for example, piezoelectric acceleration sensor) which measures the position of a pendulum (a combination of a weight and a spring) provided inside the device; and the like.

The position, speed, or acceleration of the projection optical system is measured by fitting the position/speed/acceleration measurement sensor 7 described above to the projection optical system. For example, in the projection optical system PO (FIG. 5), the position, speed, or acceleration of the fourth curved mirror M4 can be measured by fitting the position/speed/acceleration measurement sensor 7 to the fourth curved mirror M4. Here, it is preferable that the position/speed/acceleration measurement sensor 7 be provided at an area where sensitivity to movement of the image area is large in the projection optical system PO, for example, the fourth curved mirror M4.

This optical device vibrator A5 adopts configuration such that the driving mechanism 1 is controlled so as to reduce the amount of position shift by using correction information corresponding to optical system position information. This control is performed based on the correction information (that is, information on relationship between optical system position and a correction value) saved in the storage apparatus 3 (non-volatile memory and or the like). The correction information is correction information corresponding to the optical system position information from the position/speed/acceleration measurement sensor 7, and is previously saved in the storage apparatus 3 as the information on the relationship between optical system position and a correction value for achieving optimum optical performance at the corresponding optical system position. On the other hand, the optical system position is measured by the position/speed/acceleration measurement sensor 7, and a result of this measurement is inputted as optical system position information to the controller 2. The controller 2 determines a correction value based on the optical system position information inputted from the position/speed/acceleration measurement sensor 7 and the information on the relationship between optical system position and a correction value which is read from the storage apparatus 3, and then, based on this correction value, changes the setting for the position or angle (of the optical device 9) serving as a reference for repeated change. More specifically, the controller 2 converts the control signal waveform in accordance with the magnitude of the correction value.

The converted control signal is inputted to the driving mechanism 1, which vibrates the optical device 9 mainly under the condition that the position or the angle is corrected. A driving force for vibrating the optical device 9 is generated from an actuator (voice coil motor, piezoelectric device, or the like) included in the driving mechanism 1, so that the converted control signal controls the driving of the actuator. For example, if control for making no correction is performed with the control signal waveform (in normal condition with a vibration center voltage of 0V serving as a reference) shown in FIG. 3, control for making correction with a correction value of +0.1V is performed with the control signal waveform (in shifted condition with a vibration center voltage of +0.1V serving as a reference) shown in FIG. 4. Performing control of repeatedly changing the position or angle of the optical device 9 in predetermined cycles by using this control signal waveform (FIG. 4) in shifted condition results in shift of the center position or center angle of the vibration of the optical device 9 by an amount corresponding to the corrected value. This therefore permits reducing the position shift of the projection image area even in the event of vibration of the projection optical system due to external influence (internal vibration, sound, or the like). Therefore, image quality degradation and the like attributable to projector operating condition change can be reduced, thus maintaining favorable optical performance.

Figure 13:
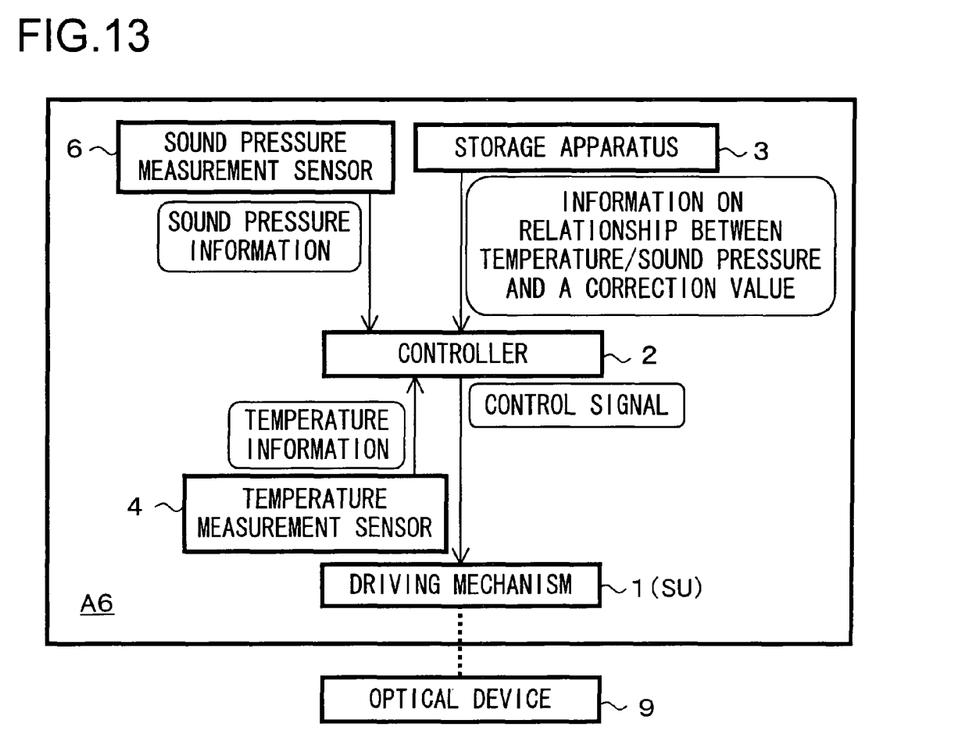
FIG. 13 is a block diagram showing schematic configuration of an optical device vibrator (of Type 6) according to an embodiment of the invention.

FIG. 13 shows schematic configuration of the optical device vibrator A6 of Type 6. This optical device vibrator A6 is a vibrator for vibrating an optical device in a projection-type image display apparatus having a speaker fitted inside or outside thereof, and has: a driving mechanism 1 which repeatedly changes the position or angle of the optical device 9 in predetermined cycles to vibrate the optical device 9; a controller 2 which controls driving of the driving mechanism 1; a storage apparatus 3 which saves information on relationship between temperature, sound pressure (generated from the speaker), and a correction value; a sensor 4 which detects and outputs temperature information; and a sensor 6 which detects and outputs sound pressure information. The optical device 9, for example, forms part of a projection optical system in a projector, and at least one optical device (mirror, lens, or the like) 9 serves as a target of the optical device vibrator A6.

As described above, structures (holder, optical base components, and the like) for holding the optical device are usually formed of metal (aluminum or the like) or plastic; therefore, in the event of temperature change while the projector is in use, the thermal expansion occurs whereby the dimension thereof change. This causes shift of the position and angle of the optical device 9 and thus image quality degradation of a projected image (for example, position shift of the projected image or aberration deterioration). The temperature measurement sensor 4 measures external temperature and temperatures of the projection optical system and the like which cause the shift of the position and angle and the image quality degradation, and temperature measurement is made by providing the temperature measurement sensor 4 around the projection optical system PO (FIG. 5).

As described above, the use of the projector having the speaker fitted inside or outside thereof may cause the mirror or folded mirror of the projection optical system, or a cabinet of the rear projection TV to vibrate under the influence of sound pressure generated from the speaker, thus causing position shift of a projected image. The sound pressure generated from this speaker is measured by the sound pressure measurement sensor 6, a detailed example of which is a microphone. The sound pressure measurement sensor 6 is a device capable of, in accordance with a value of sound pressure of a sonic wave entering the sensor, changing values of capacitance or potential difference. The sound pressure measurement is made with this sound pressure measurement sensor 6 provided around the projection optical system PO (FIG. 5) or at the screen surrounding section.

This optical device vibrator A6 is configured such that the temperature and the sound pressure are measured by the temperature measurement sensor 4 and the sound pressure measurement sensor 6, respectively, and that, based on correlation between values of these measurements and shift of the image area, image position shift with relatively small temporal change caused by temperature change and image position shift which changes in relatively short cycles and caused by the sound pressure are corrected. That is, the configuration for controlling the driving mechanism 1 is adopted which reduces the degree of image quality degradation and the amount of image position shift.

The control described above is performed based on correction information (that is, information on relationship between temperature/sound pressure and correction values) saved in the storage apparatus 3 (nonvolatile memory or the like). The correction information is correction information corresponding to the temperature information from the temperature measurement sensor 4 and the sound pressure information from the sound pressure measurement sensor 6, and previously saved in the storage apparatus 3 as information on relationship between temperature/sound pressure and correction values for achieving optimum optical performance and image position at corresponding temperature and sound pressure. On the other hand, temperature (for example, the outside air temperature, temperature of the projection optical system, or the like) is measured by the temperature measurement sensor 4, and a result of this measurement is inputted as temperature information to the controller 2. The sound pressure is measured by the sound pressure measurement sensor 6, and a result of this measurement is inputted as sound pressure information to the controller 2. The controller 2, based on the temperature information inputted from the temperature measurement sensor 4, the sound pressure information inputted from the sound pressure measurement sensor 6, and the information on relationship between temperature, sound pressure, and correction values read from the storage apparatus 3, determines a correction value, and based on this correction value, changes the setting for the position or angle (of the optical device 9) serving a reference for repeated change. More specifically, the controller 2 converts the control signal waveform in accordance with the magnitude of the correction value.

The converted control signal is inputted to the driving mechanism 1, which vibrates the optical device 9 mainly under the condition that the position or the angle is corrected. A driving force for vibrating the optical device 9 is generated from an actuator (voice coil motor, piezoelectric device, or the like) included in the driving mechanism 1, so that the converted control signal controls the driving of the actuator. For example, if control for making no correction is performed with the control signal waveform (in normal condition with a vibration center voltage of 0V serving as a reference) shown in FIG. 3, control for making correction with a correction value of +0.1V is performed with the control signal waveform (in shifted condition with a vibration center voltage of +0.1V serving as a reference) shown in FIG. 4. Performing control of repeatedly changing the position or angle of the optical device 9 in predetermined cycles by using this control signal waveform (FIG. 4) in shifted condition results in shift of the center position or center angle of the vibration of the optical device 9 by an amount corresponding to the magnitude of the corrected value. This therefore permits reducing deterioration in optical performance (position shift of the projection image area, deterioration in the projection optical performance) even in the event of vibration or deformation occurring in the projection optical system due to external influence (internal vibration, sound, temperature, or the like). Therefore, image quality degradation and the like attributable to the projector operating condition and environmental change can be reduced, thus maintaining favorable optical performance.

In this optical device vibrator A6, the information on the relationship between temperature, sound pressure, and correction values is stored in the storage apparatus 3. Alternatively, two information including information on relationship between temperature and a correction value and information on relationship between sound pressure and a correction value may be stored so that the controller 2 reads the two information including the information on relationship between temperature and a correction value and the information on relationship between sound pressure and a correction value to perform calculation (for example, linear sum) to thereby determine the correction value.

Any of environment measurement sensors (humidity measurement sensor, air pressure measurement sensor, and the like) other than the temperature measurement sensor 4 may be used, or those may be used in combination. Correction information in this case corresponds to an environment information value (temperature, humidity, air pressure, or the like) from the corresponding sensor, and may be previously saved in the storage apparatus 3 as information on relationship between the environment information value and a correction value for achieving optimum optical performance with this environment information value. Sound information other than sound pressure information may be used. For example, use of a signal or information for driving the speaker instead of the sound pressure information permits suppressing projection image area position change caused due to the influence of sound pressure without using the sound pressure measurement sensor 6. Moreover, the position/speed/acceleration measurement sensor 7 (FIG. 12) instead of the sound pressure sensor may be used to perform control based on the temperature information and the optical system position information, although not limited thereto. Thus, various sensors which measure phenomenon causing image position shift may be used alone or in combination to perform control by using results of measurements obtained by these sensors.

Like the optical device vibrators A3 to A6 of 3 to 6 described above, if a sensor is provided which detects and outputs operation information (image area position information, sound pressure information, optical system position information, or the like), the controller 2 can read from the storage apparatus 3 correction information corresponding to this operation information, and, based on this correction information, change the setting for the position or angle serving as reference for repeated change to thereby reduce image quality degradation or the like attributable to operating condition change, thus maintaining favorable optical performance. Therefore, preferable configuration is such that a driving mechanism which repeatedly changes the position or angle of an optical device in predetermined cycles in order to vibrate the optical device, a controller which controls driving of this driving mechanism, a storage apparatus which saves correction information, and a sensor which detects and outputs operation information is provided, and such that the controller reads from the storage apparatus correction information corresponding to operation information from the sensor, and, based on this correction information, and changes the setting for the position or angle serving as reference for repeated change. Further preferable configuration is such that a driving mechanism which repeatedly changes the position or angle of an optical device in predetermined cycles in order to vibrate the optical device, a controller which controls driving of this driving mechanism, a storage apparatus which saves correction information, a sensor which detects and outputs environment information, and a sensor which detects and outputs operation information are provided, and such that the controller reads from the storage apparatus the correction information corresponding to the environment information and the operation information from the sensors and, based on this correction information, changes the setting for the position or angle serving as a reference for repeated change.

An optical device vibrator according to the embodiments includes: a driving mechanism which repeatedly changes the position or angle of an optical device in predetermined cycles in order to vibrate the optical device and a controller which controls driving of this driving mechanism. The controller changes a setting for the position or angle serving as a reference for the repeated change based on predetermined correction information. This therefore permits achieving an optical device vibrator capable of vibrating the optical device with high accuracy and correcting optical performance with simple configuration that does not lead to upsizing of the apparatus. For example, use of the optical device vibrator according to the embodiments for an optical device forming part of a projection optical system in a projector permits making the contour of pixels projected on the screen surface appear less outstanding by way of pixel shift with high accuracy to thereby display a smooth image while maintaining favorable optical performance, thus stably achieving higher image grade through resolution improvement. The embodiments are greatly effective in adjusting the position of a projected image and correcting position shift of a projected image caused by temperature change. Therefore, the embodiments can greatly contribute to achieving a slimmer, lighter-weight, more compact, lower-cost, higher-performance, higher-function projector.

For example, saving in a storage apparatus a correction value as correction information at product assembly in order to provide the best optical performance in usage state permits favorably correcting the optical performance by the controller changing the setting for the position or angle serving as the reference for the repeated change based on the correction information. Moreover, providing a sensor which detects and outputs environment information (temperature, humidity, air pressure, or the like) permits the controller to read from the storage apparatus correction information corresponding to the environment information and change the setting for the position or angle serving as the reference for the repeated change based on the correction information, which permits reducing deterioration in the optical performance attributable to environment change thus maintaining favorable optical performance. Providing a sensor which detects and outputs operation information (image area position information, sound pressure information, sound information, projection optical system position information, or the like) permits the controller to read from the storage apparatus correction information corresponding to the operation information and change the setting for the position or angle serving as the reference for the repeated change based on the correction information, which permits reducing deterioration in the optical performance attributable to operating condition change thus maintaining favorable optical performance.

What is claimed is:

1. An optical device vibrator comprising:
   a driving mechanism which repeatedly changes position or angle of an optical device in predetermined cycles in order to vibrate the optical device;
   a controller which controls driving of the driving mechanism; and
   a storage apparatus which saves the correction information and a sensor which detects and outputs environment information,
   wherein the controller changes a setting for the position or angle serving as a reference for the repeated change based on predetermined correction information and,
   wherein the controller reads from the storage apparatus the correction information corresponding to the environment information from the sensor and, based on the correction information, changes the setting for the position or angle serving as the reference for the repeated change.

2. An optical device vibrator comprising:
   a driving mechanism which repeatedly changes position or angle of an optical device in predetermined cycles in order to vibrate the optical device; and
   a controller which controls driving of the driving mechanism,
   wherein the controller changes a setting for the position or angle serving as a reference for the repeated change based on predetermined correction information and
   wherein the driving mechanism includes: a vibration member for vibrating the optical device while keeping the optical device held; and an actuator which drives the vibration member to vibrate the optical device, the vibration member having a pair of fixed parts, a movable part capable of vibration relative to the fixed parts while keeping the optical device held, and a pair of hinge parts coupling together the fixed parts and the movable part, the movable part rotationally vibrating in response to a force from the actuator, with a straight line linking together centers of the pair of hinge parts being provided as a central axis.

3. The optical device vibrator according to claim 2, further comprising a storage apparatus which saves the correction information,
   wherein the controller reads the correction information from the storage apparatus and, based on the correction information, changes the setting for the position or angle serving as the reference for the repeated change.

4. The optical device vibrator according to claims 1 or 2, wherein the driving mechanism has an actuator which generates a driving force for vibrating the optical device, the actuator being formed of a voice coil motor.

5. The optical device vibrator according to claims 1 or 2, wherein the driving mechanism has an actuator which generates a driving force for vibrating the optical device, the actuator being formed of a piezoelectric device.

6. A projection-type image display apparatus comprising:
   a display device having a plurality of pixels for forming a two-dimensional image;
   a projection optical system which is configured to guide a two-dimensional image formed by the display device onto a screen;
   a driving mechanism which is configured to repeatedly change, in predetermined cycles, a position or angle of an optical device forming part of the projection optical system so as to shift a position of the plurality of pixels comprising a two-dimensional image projected onto the screen; and
   a controller which is configured to control the driving of the driving mechanism,
   wherein the controller is configured to control the repeated change of the position or angle of the optical device, and, based on predetermined correction information, change a setting for the position or angle serving as the reference for the shift of the position of the plurality of pixels projected onto the screen.

7. The projection-type image display apparatus according to claim 6,
   wherein the predetermined correction information is environment information.

8. The projection-type image display apparatus according to claim 7,
   wherein the environment information is at least one of temperature, humidity, and air pressure.

9. The projection-type image display apparatus according to claim 6,
wherein the predetermined correction information is operation information.

10. The projection-type image display apparatus according to claim 9,
wherein the operation information is at least one of image area position information, sound pressure information, sound information, and projection optical system position information.

11. The projection-type image display apparatus according to claim 6,
wherein the predetermined correction information is environment information and operation information.

12. The projection-type image display apparatus according to claim 6,
wherein the projection optical system includes a plurality of curved mirrors, and wherein the driving mechanism drives the curved mirrors.

13. The projection-type image display apparatus according to claim 6,
wherein the predetermined cycles correspond to the image update rate of the display device.

14. The projection-type image display apparatus according to claim 13,
wherein the driving mechanism includes an actuator, said actuator being configured to receive a control signal waveform from the controller for implementing the predetermined cycles.

15. The projection-type image display apparatus according to claim 14,
wherein the plurality of pixels are shifted on the screen by one-half of a pixel pitch in each of the predetermined cycles.

* * * * *